(12) United States Patent
Capt et al.

(10) Patent No.: US 10,600,083 B2
(45) Date of Patent: Mar. 24, 2020

(54) SIMULATION OF MESSAGES FROM INTERNET OF THINGS (IOT) DEVICES FOR DIGITAL SIGNAGE

(71) Applicant: Adobe Inc., San Jose, CA (US)

(72) Inventors: Alexandre Capt, Landser (FR); Damien Antipa, Basel (CH)

(73) Assignee: Adobe Inc., San Jose, CA (US)

(*) Notice: Subject to any disclaimer, the term of this patent is extended or adjusted under 35 U.S.C. 154(b) by 480 days.

(21) Appl. No.: 15/448,699

(22) Filed: Mar. 3, 2017

(65) Prior Publication Data

US 2018/0253758 A1  Sep. 6, 2018

(51) Int. Cl.
*G06Q 30/02* (2012.01)
*H04W 4/70* (2018.01)
*H04L 29/08* (2006.01)

(52) U.S. Cl.
CPC ..... *G06Q 30/0252* (2013.01); *G06Q 30/0244* (2013.01); *H04L 67/2819* (2013.01); *H04W 4/70* (2018.02)

(58) Field of Classification Search
USPC ........................................ 715/781; 348/14.01
See application file for complete search history.

(56) References Cited

U.S. PATENT DOCUMENTS

| | | | |
|---|---|---|---|
| 10,235,480 B2 | 3/2019 | Broodney et al. | |
| 2007/0079252 A1* | 4/2007 | Ramnani | G06F 9/451 |
| | | | 715/781 |
| 2007/0252891 A1* | 11/2007 | Gurley | G06Q 30/02 |
| | | | 348/14.01 |
| 2010/0253509 A1 | 10/2010 | Fu et al. | |
| 2011/0286302 A1 | 11/2011 | Welker et al. | |

* cited by examiner

*Primary Examiner* — Saba Dagnew
(74) *Attorney, Agent, or Firm* — Finch & Maloney PLLC

(57) ABSTRACT

Techniques are disclosed for the simulation of Internet of Things (IoT) device messages to control the generation and rendering of digital signage on a display module. A methodology implementing the techniques according to an embodiment includes intercepting messages that are transmitted from the devices to the display modules, and extracting or otherwise accessing sensor data from the intercepted messages. The sensor data can be provided to a user interface configured to allow a user to edit or manipulate the sensor data. A modified or transformed message is generated, based on the intercepted message and the edited sensor data. The modified or transformed message is transmitted to the display module, which is configured to render digital signage based on the content of the message. These techniques enable the user to visualize and evaluate alternative signage renderings in a relatively convenient manner by manipulating the sensor data reported from the IoT devices.

20 Claims, 6 Drawing Sheets

Simulation UI
402

Rendered Pages
404

US 10,600,083 B2

SIMULATION OF MESSAGES FROM INTERNET OF THINGS (IOT) DEVICES FOR DIGITAL SIGNAGE

FIELD OF THE DISCLOSURE

This disclosure relates to techniques for simulation of Internet of Things (IoT) devices, and more particularly, to techniques for simulation of IoT devices for digital signage.

BACKGROUND

Cloud-based marketing is becoming increasingly integrated with Internet of Things (IoT) devices. One such cloud-based marketing technique, sometimes referred to as "digital signage," employs display screens that deliver real-time, targeted advertising messages, based on data provided from IoT device sensors. For example, raincoats or umbrellas may be displayed if sensors detect that it is raining. So, in some respects, the digital signage is intelligent. Marketers can prepare both content and rules, to govern the display of such content based on sensor data. However, it can be difficult to develop and field test such systems, because the marketer does not necessarily have direct control over, or knowledge of, the IoT device sensor messages. In order to test the digital signage, the IoT device sensors need to be physically acted upon to generate a particular type or range of data values that are of interest in a given application, to trigger the generation of associated advertising content. Testing of the digital signage applications therefore requires certain conditions to exist so as to trigger the IoT device sensors to output a message to the digital signage application. In other words, for example, to test a given proximity-based or temperature-based application, the marketer would need to move in front of a proximity sensor to trigger a proximity event, or heat a temperature sensor to trigger a warm temperature event, which is neither convenient nor practical.

DETAILED DESCRIPTION

Figure 1:
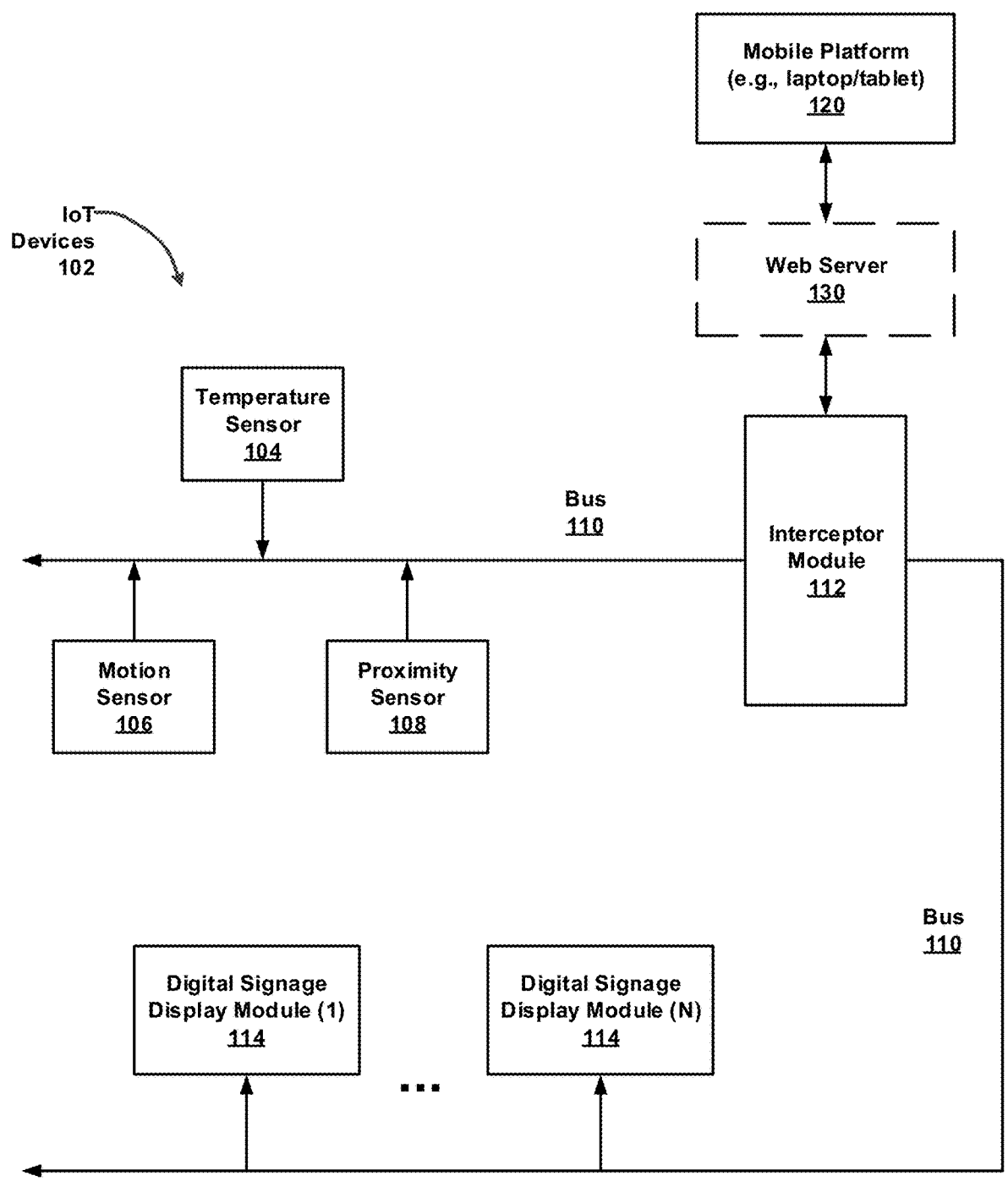
FIG. 1 is a block diagram of a system to implement digital signage based on simulated IoT device messages, configured in accordance with an embodiment of the present disclosure.

Digital signage systems can deliver targeted advertising messages to display modules based on real-time (or near real-time) sensor data provided from IoT devices. The display modules include screens and associated processors configured to execute rule-based engines that determine the advertising content to be rendered, based on messages received from the IoT devices. For example, a motion sensor may detect motion of a shopper in a store to trigger the initiation of a particular display, or a proximity sensor may detect that the shopper is within a certain range of a particular location to trigger the display, or a weather sensor may detect that it is raining to generate display content that includes raincoats or umbrellas. Marketers can prepare the advertising content and the associated rules that govern the rendering of such content based on the sensor data. However, as previously noted, it can be difficult to develop and test such systems without control of the device messages. For example, a weather sensor will generally not send a message indicating rain unless it is actually raining, and a temperature sensor will report the actual temperature rather than a desired test temperature. As such, it can be difficult to trigger particular rules that are of interest to the user, for example during development, testing, maintenance, or demonstration of the system.

To this end, techniques are disclosed for simulation of IoT device sensor messages to control the generation and rendering of digital signage. The simulation is achieved by intercepting messages that are transmitted from the IoT device sensors to the digital signage display modules. The interceptor is configured to monitor a communication bus (e.g., an event bus) over which the messages are transmitted. The bus may be implemented as a network, for example a local area network or a wide area network or some combination of such networks, which may be wired or wireless. In some embodiments, the sensor data is extracted from the messages and provided to the user (e.g., a marketer or system developer) through a user interface or authoring tool that provides a capability for editing of the sensor data values. For example, the sensor values may include a temperature reading, and the user interface enables the user to change that reading to any desired value that will trigger or otherwise be associated with a rule of interest. A simulated device message, incorporating the edited data values, can then be generated and passed on to the display modules over the bus and the user can observe the effect of the simulated device message on the display module. Note that the forwarded message may simply be a modified version of the message originally generated by the IoT device sensor, or a replacement message. This intercept, edit, and forward based message process can be repeated as desired to facilitate testing of the digital signage application.

Additionally, since digital signage systems can often employ numerous IoT devices, provided by different vendors, the format of the messages may vary to some extent from one device to another. In some embodiments, the interceptor is configured to reformat the intercepted messages to a desired standardized format that can be more easily processed by the display modules. The task of parsing different message formats is thus transferred from multiple display modules to the interceptor module which can improve system efficiency and reduce costs. For instance, any display module could be used with a given IoT device sensor, without concern for whether or not that IoT device sensor and display module are compatible with one another. To this end, the interceptor may provide a centralized IoT device sensor message standardization process.

In more detail, and in accordance with an embodiment of the present disclosure, a digital signage system is configured to simulate IoT device messages to control the generation and rendering of digital signage. In one embodiment, a message interceptor module is configured to read messages, transmitted over a bus (event bus, or any other suitable communication medium), from a device sensor to a display module, and to extract sensor data from the intercepted IoT messages. The sensor data is provided or otherwise made available to a user interface that is configured for editing the data. The user interface may be hosted on a mobile platform, such as a tablet, a laptop, or a smartphone, which interfaces to the interceptor module, either directly or through a Web server or other appropriate mechanism, which allows the user to be located at the site or located remotely. The edited data is employed to generate a transformed message, whether the transformed message be a modified version of the original message or a replacement message. In either case, the new message simulates and substitutes for the original device message. The message interceptor module is further configured to transmit the transformed/simulated message to the display module. The display module is configured to render digital signage content based on an application of rules to the transformed message.

In another example use case and embodiment, the message interceptor module is further configured to reformat the intercepted messages into a standardized or common format. For example, one temperature sensing IoT device may generate a message in the format "sensorId: xyz, temperature: 50," while another device may generate the message as "id: abc, temp: 60." These messages can be converted into any selected format of convenience such as "id: xyz, temperature: 50" and "id: abc, temperature: 60."

In yet another example use case and embodiment, the message interceptor module is configured to restrict the edited sensor data to a selected range of values that are based on an expected operational range of the display module. For example, an edited temperature reading of 200 degrees might expose a malfunction or bug in the execution of the display module's rule-based engine, and therefore it would be desirable, in this example scenario, to restrict the edited temperatures to a range of, for example, 0 degrees to 100 degrees, to increase system reliability and stability.

Thus, the foregoing framework provides a tool to simulate IoT device messages to control the generation and rendering of digital signage. The simulation capability is provided by a message interceptor module that is coupled to an event bus over which messages are transmitted between IoT devices and display modules. The simulation can be controlled through a user interface executing on a platform in the vicinity of the display modules, such that the user can receive immediate feedback on rule changes and other aspects of the system operation. Alternatively, the simulation can be controlled through a user interface executing on a platform that is remote to the display modules. In some such cases, local cameras can be used to monitor the display modules, and the video feed can be provided via a communication network so that the user can still receive immediate feedback on rule changes and other aspects of the system operation. In still other such cases, the display modules can be configured to communicate their messaging to the remote platform via a communication network, so that the user can still receive immediate feedback on rule changes and other aspects of the system operation. The disclosed techniques improve the efficiency, and lower the cost, of development, testing, and maintenance of digital signage systems. Numerous configurations and variations will be apparent in light of this disclosure.

System Architecture

FIG. 1 is a block diagram 100 of a system to implement digital signage based on simulated IoT device messages, configured in accordance with an embodiment of the present disclosure. As can be seen, a number of IoT devices 102 are coupled to a bus 110. Example devices shown include a temperature sensor 104, a motion sensor 106, and a proximity sensor or beacon 108. Other types of devices and sensors may also be employed, as will be appreciated in light of this disclosure. Any number of digital signage display modules 114 can also be coupled to the bus 110, as shown. The devices 102 are configured to send messages over the bus to the display modules 114. The messages include sensor data, and any other suitable information, that will be consumed by the display modules, which are configured to execute rule-based engines that determine the display content to be rendered based on the provided data. In some embodiments, the bus may include any number of forwarding modules or proxy instances to handle operations over multiple locations.

An interceptor module 112 is also shown to be coupled to the bus 110. The interceptor module is configured to intercept the device messages and transform those messages into simulated messages based on edited data, as will be explained in greater detail below. A mobile platform 120 (e.g., a laptop, tablet, or smart phone), or other computing device, is also coupled to the interceptor module 112, either directly or through a Web server 130. The mobile platform is configured to provide a user interface or other suitable authoring tool to allow the user to edit the data in the device messages, as will also be explained below.

Figure 2:
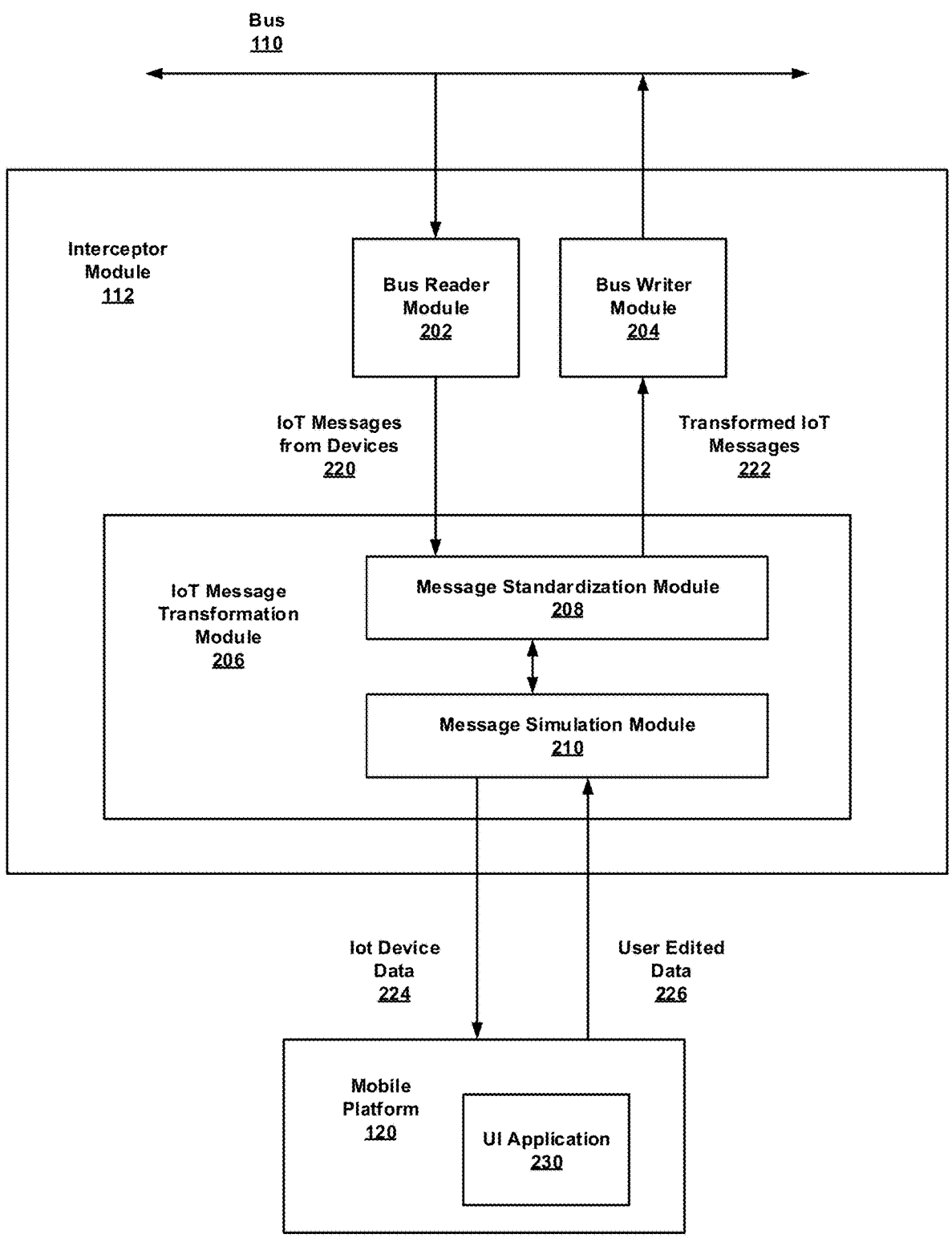
FIG. 2 is a block diagram of a message interceptor module, configured in accordance with an embodiment of the present disclosure.

FIG. 2 is a block diagram of the message interceptor module 112, configured in accordance with an embodiment of the present disclosure. The message interceptor module 112 is shown to include a bus reader module 202, a bus writer module 204, and an IoT message transformation module 206, which further includes a message standardization module 208 and a message simulation module 210.

The bus reader module 202 is configured to intercept messages 220 transmitted from the sensor devices to the display modules over the bus 110. In some embodiments, the bus may be implemented using websockets that are configured to forward information collected by each device sensor. Additionally, the devices may be configured to generate login messages to identify their presence on the bus, from which the bus reader may discover, recognize, and classify the devices (e.g., a temperature sensor versus a proximity sensor, and an expected format of the messages to be generated by the device).

The message transformation module 206 is configured to extract sensor data from the intercepted messages. Sensor data may include, for example, temperature data, weather data, motion data, proximity data, geo data (e.g., GPS coordinates or other locationing data), and/or any other information that may be relevant to the rule-based generation of advertising display content.

The message simulation module 210 is configured to provide the device sensor data 224 to a user interface (UI) application 230, executing on the mobile platform 120. The UI application is configured for editing or any other desired manipulation of the sensor data. The message simulation module 210 is further configured to receive the edited sensor data 226 from the UI application 230. In some embodiments, the message simulation module 210 is also configured to restrict the edited sensor data 226 to a selected range of values associated with an expected operational range of the display module.

The message transformation module 206 is further configured to generate a transformed message 222, to be associated with the sensor device, based on the edited sensor data 226 and the intercepted message 220. The bus writer module 204 is configured to transmit the transformed message 222 to the display module over the bus 110, such that the display module can render the rule-based digital signage based on the transformed message.

The message standardization module 208 is configured to format the intercepted message 220 into a selected standardized format that can be commonly recognized by the display modules. In some embodiments, the device classification, performed by the bus reader module in response to the device login message, provides information about the expected message format to be received from a given device.

Figure 3:
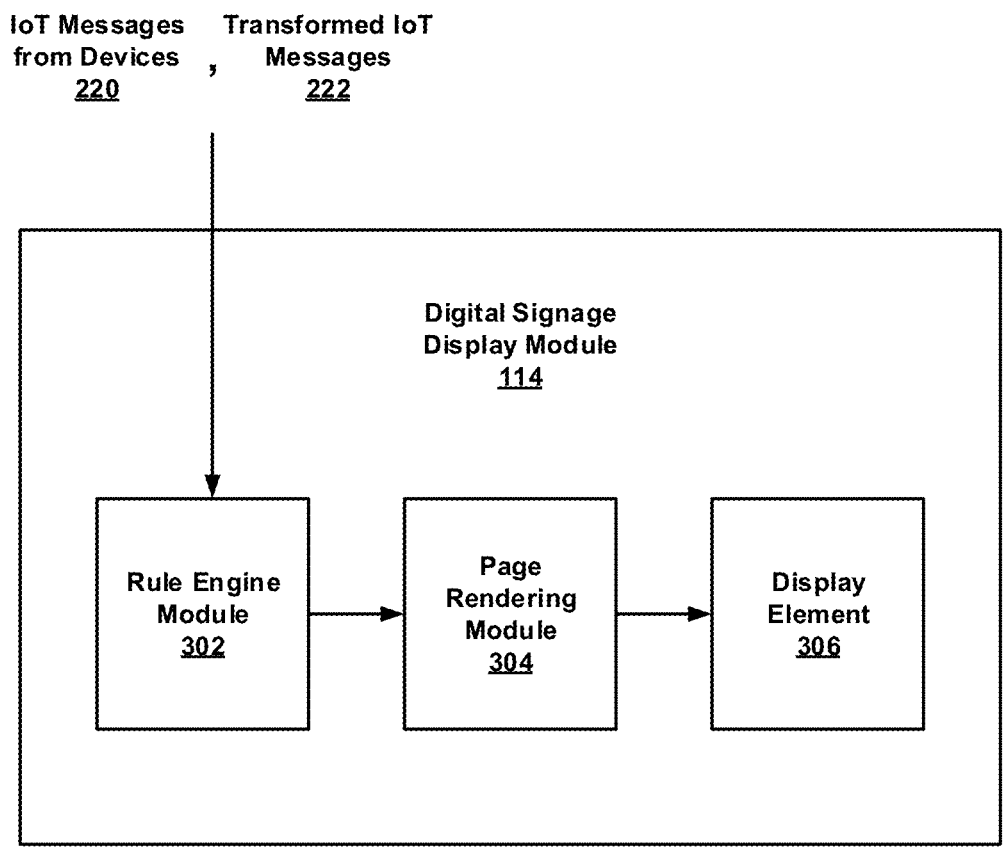
FIG. 3 is a block diagram of a digital signage display module, configured in accordance with an embodiment of the present disclosure.

FIG. 3 is a block diagram of a digital signage display module 114, configured in accordance with an embodiment of the present disclosure. The digital signage display module 114 is shown to include a rule-engine module 302, a page rendering module 304, and a display element or screen 306. The rule engine module 302 receives messages from the bus 110, including IoT messages from devices 220 and/or transformed IoT messages 222. The type of message, whether original 220 or transformed 222, is transparent to the digital signage display module 114. The rule engine module 302 is configured to extract sensor data from the messages and apply rules to that data to determine the display content that will be rendered. In some embodiments, the rules may be downloaded to the digital signage display module, by a rule author such as, for example, the user of the mobile platform 120. Some rules may be relatively simple, such as "if it is raining, display or raincoat," or "if it is sunny, display sunglasses." Other rules may be relatively more complex, such as "based on the presence of conditions A, B, and C, and the absence of condition D, display content X, otherwise display content Y." The page rendering module 304 is configured to construct the contents of the page to be displayed, by display element 306, based on the results of the rule engine processing.

Figure 4:
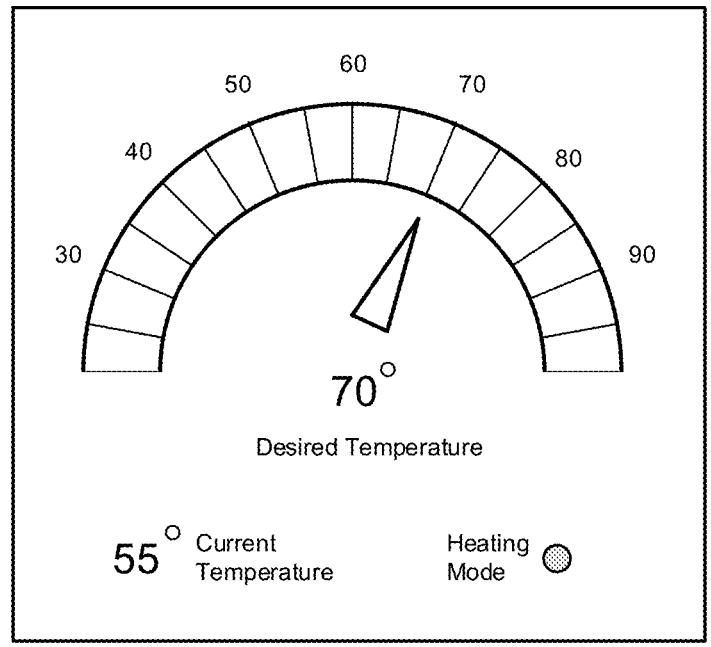
FIG. 4 illustrates an example simulation user interface and rendered signage pages, in accordance with an embodiment of the present disclosure.
Figure 4:
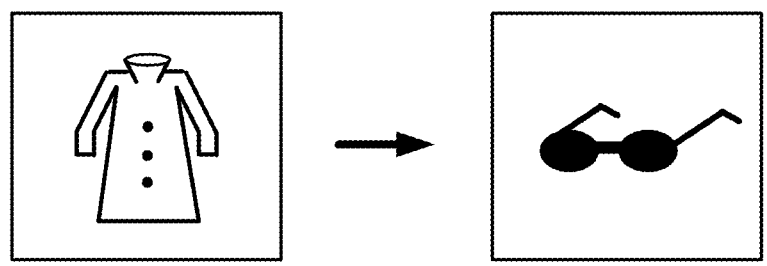

FIG. 4 illustrates an example simulation user interface window 402 and rendered page content 404, in accordance with an embodiment of the present disclosure. The user interface application 230 can be configured to display any number of windows or other controls to adjust various parameters of the simulated message. One such window 402, to control temperature, is shown. In this example the window shows the current temperature, as reported by the original device message 220, to be 55 degrees. The window also provides a dial control for the user to set a desired temperature, in this example 70 degrees, the value of which will be used in the simulated message 222. As a result of this adjustment in temperature value, the rendered pages 404 are shown to change from a coat to sunglasses, as an example.

Methodology

Figure 5:
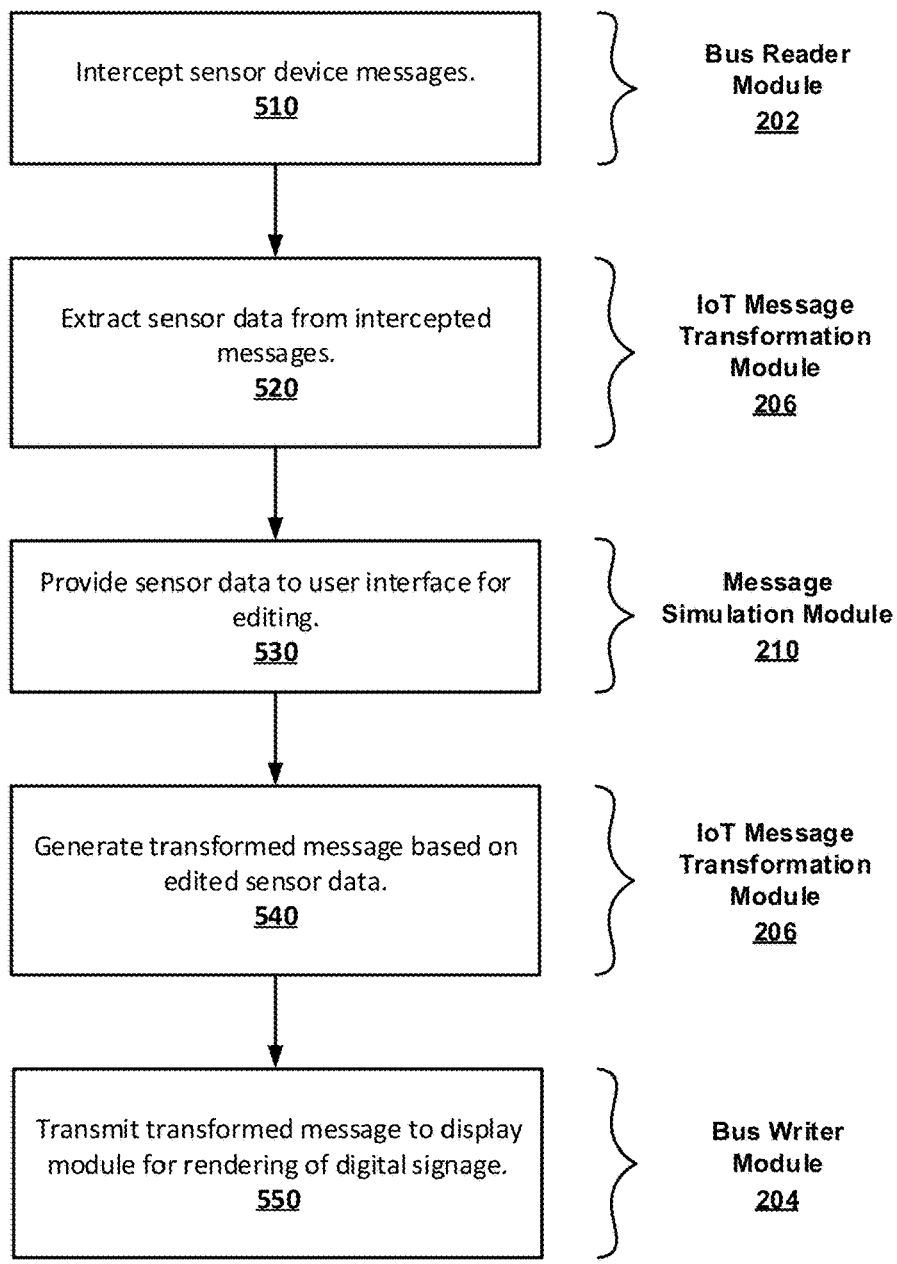
FIG. 5 is a flowchart illustrating a method for simulation of IoT device messages, in accordance with an embodiment of the present disclosure.

FIG. 5 is a flowchart illustrating a method 500 for the simulation of IoT device messages to control the generation and rendering of digital signage, in accordance with an embodiment of the present disclosure. As can be seen, the method is described with reference to the configuration of interceptor module 112 of FIG. 2. However, any number of interceptor module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 510, by intercepting a message transmitted from a sensor device to a display module. The sensor device may be an IoT device such as, for example, a temperature sensor or weather station, a motion sensor, a beacon (e.g., proximity sensor), or any other suitable device that may provide information relevant to the generation and content of the digital signage. The method continues, at operation 520, by extracting sensor data from the intercepted message. An example intercepted sensor message might be, "sensorId: xyz, temperature: 55" from which the extracted sensor data would be 55 degrees.

Next, at operation 530, the sensor data is provided to a user interface that is configured to allow the user to edit the sensor data. For example, the user can change 55 degrees to 70 degrees. In some embodiments, the user interface is hosted on a mobile platform, such as a laptop, a tablet, or a smartphone. The mobile platform may interface to the interceptor, either directly or indirectly (e.g., through a Web server).

At operation 540, a transformed message, to be associated with the sensor device, is generated based on the edited sensor data and the intercepted message from the sensor device. For example, the transformed message can be "sensorId: xyz, temperature: 70."

At operation 550, the transformed message is transmitted to the display module, which is configured to render digital signage based on the messages it receives, either directly from the sensor device or through the interceptor, through the application of rules to the message. For example, with an increase in temperature, the digital signage may change from an advertisement for a coat to an advertisement for sunglasses.

In some embodiments, additional operations are performed. For example, in one embodiment, the intercepted message is formatted into a selected standardized format. Because different devices, for example from different vendors, may generate messages in varying formats, it is desirable to standardize the messages into a common selected format which can simplify message consumption processing on the display modules. For example, one temperature sensing device may generate a message as "sensorId: xyz, temperature: 50," while another device may generate the message "id: abc, temp: 60." These messages can be converted into a standardized format such as "id: xyz, temperature: 50" and "id: abc, temperature: 60."

In another embodiment, the edited sensor data may be restricted to a selected range of values associated with an operational range of the display module. For example, an edited temperature reading of 200 degrees may expose a malfunction or bug in the execution of the display module's rule-based engine, and therefore it may be desirable to restrict edited temperatures to a range of, for example, 0 degrees to 100 degrees, to improve the reliability of the system.

Example Platform

Figure 6:
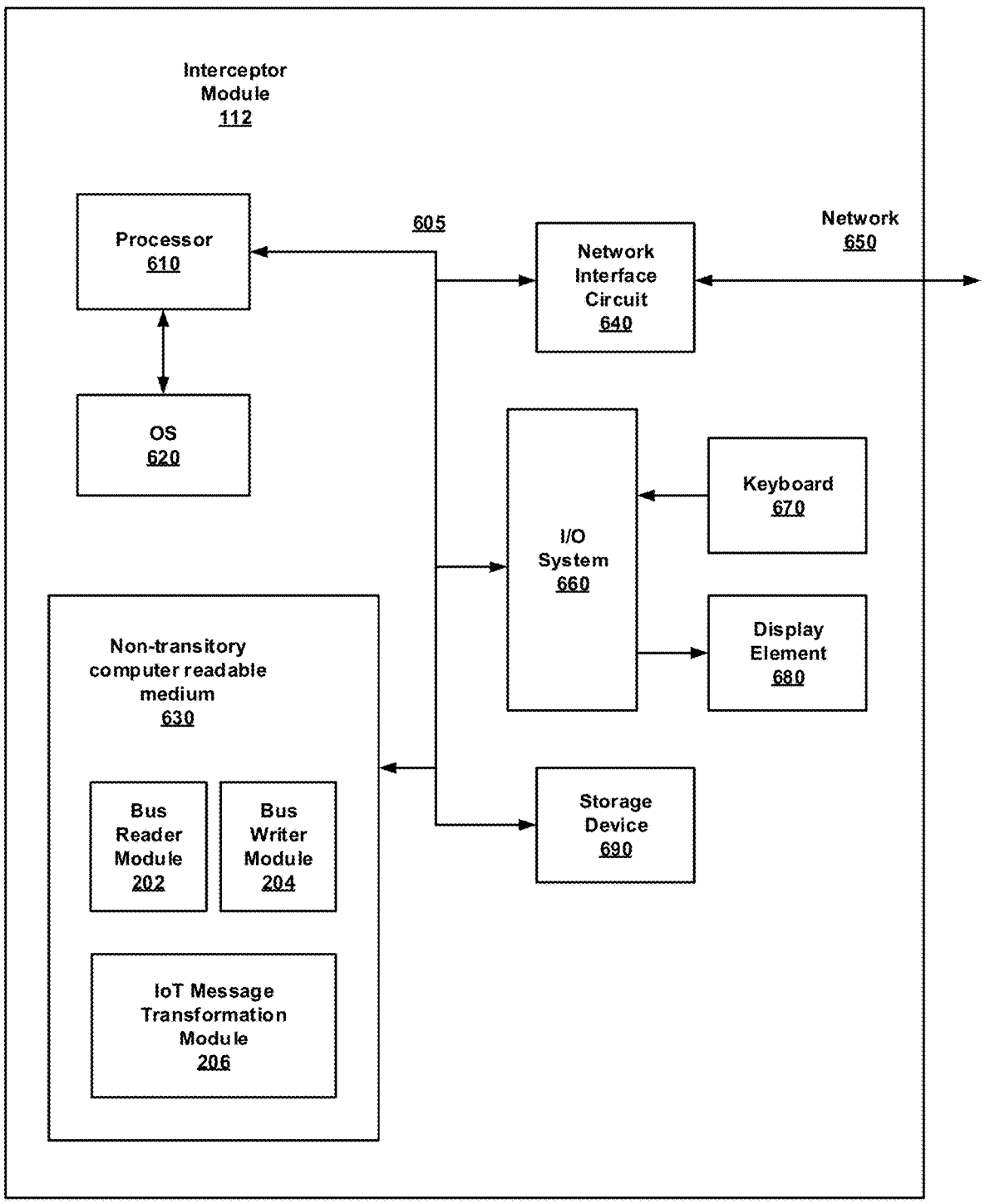
FIG. 6 is a block diagram schematically illustrating a computing device configured to perform any of the techniques as variously described in this disclosure, configured in accordance with an embodiment of the present disclosure.

FIG. 6 is a block diagram schematically illustrating a computing device 600 used to perform any of the techniques as variously described in this disclosure. For example, in some embodiments, the interceptor module 112 of FIG. 1, or any portions thereof, and the methodologies of FIG. 5, or any portions thereof, are implemented in the computing device 600. In some embodiments, the computing device 600 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing or telecommunications device that is capable of communication and that has sufficient processor power and memory capacity to perform the operations described in this disclosure. In some embodiments, a distributed computational system is provided comprising a plurality of such computing devices.

The computing device 600 includes one or more storage devices 690 and/or non-transitory computer-readable media 630 having encoded thereon one or more computer-executable instructions or software for implementing techniques as variously described in this disclosure. In some embodiments, the storage devices 690 includes a computer system memory or random access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 690 includes other types of memory as well, or combinations thereof. In one embodiment, the storage device 690 is provided on the computing device 600. In another embodiment, the storage device 690 is provided separately or remotely from the computing device 600. The non-transitory computer-readable media 630 include, but are not limited to, one or more types of hardware memory, non-transitory tangible media (for example, one or more magnetic storage disks, one or more optical disks, one or more USB flash drives), and the like. In some embodiments, the non-transitory computer-readable media 630 included in the computing device 600 store computer-readable and computer-executable instructions or software for implementing various embodiments. In one embodiment, the computer-readable media 630 are provided on the computing device 600. In another embodiment, the computer-readable media 630 are provided separately or remotely from the computing device 600.

The computing device 600 also includes at least one processor 610 for executing computer-readable and computer-executable instructions or software stored in the storage device 690 and/or non-transitory computer-readable media 630 and other programs for controlling system hardware. In some embodiments, virtualization is employed in the computing device 600 so that infrastructure and resources in the computing device 600 are shared dynamically. For example, a virtual machine is provided to handle a process running on multiple processors so that the process appears to be using only one computing resource rather than multiple computing resources. In some embodiments, multiple virtual machines are used with one processor.

As can be further seen, an interconnect 605 is also provided to allow for communication between the various components listed above and/or other components not shown. Computing device 600 can be coupled to a network 650 (e.g., a local or wide area network such as the internet), through network interface circuit 640 to allow for communications with other computing devices, platforms, resources, clients, and IoT devices.

In some embodiments, a user interacts with the computing device 600 through an input/output system 660 that interfaces with devices such as keyboard 670 and/or a display element (screen/monitor) 680 which provides a user interface to accept, for example to configure or control the interceptor module. In some embodiments, the computing device 600 includes other I/O devices (not shown) for receiving input from a user, for example, a pointing device (e.g., a mouse, or a touchpad, etc.), or any suitable user interface. In some embodiments, the computing device 600 includes other suitable conventional I/O peripherals. The computing device 600 can include and/or be operatively coupled to various suitable devices for performing one or more of the aspects as variously described in this disclosure.

In some embodiments, the computing device 600 runs an operating system (OS) 620, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing device 600 and performing the operations described in this disclosure. In one embodiment, the operating system runs on one or more cloud machine instances.

As will be appreciated in light of this disclosure, the various modules and components of the system, including the interceptor module 112 (and subcomponents 202, 204, 206, 208, and 210) can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing device 600, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a mouse, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Example Embodiments

Numerous example embodiments will be apparent, and features described herein can be combined in any number of configurations.

Example 1 includes a method to simulate device messages for digital signage. The method comprises: intercepting a message transmitted from a sensor device to a display module, the message including sensor data; generating a transformed message based on edited sensor data and the intercepted message, the transformed message associated with the sensor device; and transmitting the transformed message to the display module, the display module configured to render digital signage based on the transformed message.

Example 2 includes the subject matter of Example 1, further comprising formatting the intercepted message into a selected standardized format.

Example 3 includes the subject matter of Examples 1 or 2, further comprising restricting the edited sensor data to a selected range of values associated with an operational range of the display module.

Example 4 includes the subject matter of any of Examples 1-3, wherein generating a transformed message includes: extracting sensor data from the intercepted message; providing the sensor data to a user interface configured for editing of the sensor data; receiving the edited sensor data from the user interface; and generating the transformed message based on the edited sensor data and the intercepted message.

Example 5 includes the subject matter of any of Examples 1-4, further comprising downloading rules to a rule-based engine of the display module to further control the rendering of digital signage by the display module based on application of the rules to the transformed message.

Example 6 includes the subject matter of any of Examples 1-5, wherein the sensor data includes at least one of temperature data, weather data, motion data, geo data, and proximity data.

Example 7 includes the subject matter of any of Examples 1-6, wherein the user interface is hosted on a mobile platform, and the mobile platform is one or more of a laptop, a tablet, and a smartphone.

Example 8 includes a system to provide simulated device messages for digital signage. The system includes: one or more processors; a bus reader module at least one of controllable and executable by the one or more processors, and configured to intercept a message transmitted from a sensor device to a display module; a message transformation module at least one of controllable and executable by the one or more processors, and configured to extract sensor data from the intercepted message; a message simulation module at least one of controllable and executable by the one or more processors, and configured to provide the sensor data to a user interface configured for editing of the sensor data, and to receive the edited sensor data from the user interface; the message transformation module at least one of controllable and executable by the one or more processors, and further configured to generate a transformed message based on the edited sensor data and the intercepted message, the transformed message associated with the sensor device; and a bus writer module at least one of controllable and executable by the one or more processors, and configured to transmit the transformed message to the display module, the display module configured to render digital signage based on the transformed message.

Example 9 includes the subject matter of Example 8, further comprising a message standardization module configured to format the intercepted message into a selected standardized format.

Example 10 includes the subject matter of Examples 8 or 9, wherein the message simulation module is further configured to restrict the edited sensor data to a selected range of values associated with an operational range of the display module.

Example 11 includes the subject matter of any of Examples 8-10, wherein the sensor device is included in an Internet of Things (IoT) device.

Example 12 includes the subject matter of any of Examples 8-11, wherein the sensor data includes at least one of temperature data, weather data, motion data, and proximity data.

Example 13 includes the subject matter of any of Examples 8-12, wherein the user interface is hosted on a mobile platform, and the mobile platform is one or more of a laptop, a tablet, and a smartphone.

Example 14 includes a non-transitory computer program product having instructions encoded thereon that when executed by one or more computer processors cause the one or more computer processors to perform a process comprising: intercepting a message transmitted from a sensor device to a display module, the message including sensor data; generating a transformed message based on edited sensor data and the intercepted message, the transformed message associated with the sensor device; and transmitting the transformed message to the display module, the display module configured to render digital signage based on the transformed message.

Example 15 includes the subject matter of Example 14, further comprising formatting the intercepted message into a selected standardized format.

Example 16 includes the subject matter of Examples 14 or 15, further comprising restricting the edited sensor data to a selected range of values associated with an operational range of the display module.

Example 17 includes the subject matter of any of Examples 14-16, wherein generating a transformed message includes: extracting sensor data from the intercepted message; providing the sensor data to a user interface configured for editing of the sensor data; receiving the edited sensor data from the user interface; and generating the transformed message based on the edited sensor data and the intercepted message.

Example 18 includes the subject matter of any of Examples 14-17, further comprising downloading rules to a rule-based engine of the display module to further control the rendering of digital signage by the display module based on application of the rules to the transformed message.

Example 19 includes the subject matter of any of Examples 14-18, wherein the sensor data includes at least one of temperature data, weather data, motion data, geo data and proximity data.

Example 20 includes the subject matter of any of Examples 14-19, wherein the user interface is hosted on a mobile platform, and the mobile platform is one or more of a laptop, a tablet, and a smartphone.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method to simulate device messages for digital signage, the method comprising:
   intercepting, by a processor-based system, a message transmitted from a sensor device to a display module, the message including sensor data that is representative of an observed condition at the sensor device;
   providing the sensor data to a user interface configured for editing the sensor data;
   receiving, via the user interface, simulated sensor data that is representative of a simulated condition;

generating, by the processor-based system, a transformed message based on the simulated sensor data and the intercepted message, the transformed message associated with the sensor device; and transmitting, by the processor-based system, the transformed message to the display module, the display module configured to render digital signage based on the transformed message, such that the digital signage reflects the simulated condition.

2. The method of claim 1, further comprising formatting the intercepted message into a standardized format.

3. The method of claim 1, further comprising verifying that the simulated sensor data received via the user interface is within a range of values associated with an operational range of the display module.

4. The method of claim 1, further comprising extracting, by the processor-based system, a sensor identifier and a sensor value from the intercepted message.

5. The method of claim 1, further comprising downloading rules to a rule-based engine of the display module to further control rendering of the digital signage by the display module based on application of the rules to the transformed message.

6. The method of claim 1, wherein the sensor data includes at least one of temperature data, weather data, motion data, geo data, and proximity data.

7. The method of claim 1, wherein the user interface is hosted on a mobile platform, and the mobile platform is one or more of a laptop, a tablet, and a smartphone.

8. A system to provide simulated device messages for digital signage, the system comprising:
  one or more processors;
  a bus reader module at least one of controllable and executable by the one or more processors, and configured to intercept a message transmitted from a sensor device to a display module;
  a message transformation module at least one of controllable and executable by the one or more processors, and configured to extract sensor data from the intercepted message, wherein the sensor data is representative of an observed condition at the sensor device;
  a message simulation module at least one of controllable and executable by the one or more processors, and configured to (a) provide the sensor data to a user interface configured for editing the sensor data, and (b) receive simulated sensor data from the user interface, wherein the simulated sensor data is representative of a simulated condition, wherein the message transformation module is further configured to generate a transformed message based on the simulated sensor data and the intercepted message, and wherein the transformed message associated with the sensor device; and
  a bus writer module at least one of controllable and executable by the one or more processors, and configured to transmit the transformed message to the display module, the display module configured to render digital signage based on the transformed message, such that the digital signage reflects the simulated condition.

9. The system of claim 8, further comprising a message standardization module configured to format the intercepted message into a standardized format.

10. The system of claim 8, wherein the message simulation module is further configured to verify that the simulated sensor data received via the user interface is within a range of values associated with an operational range of the display module.

11. The system of claim 8, wherein the sensor device is included in an Internet of Things (IoT) device.

12. The system of claim 8, wherein the sensor data includes at least one of temperature data, weather data, motion data, and proximity data.

13. The system of claim 8, wherein the user interface is hosted on a mobile platform, and the mobile platform is one or more of a laptop, a tablet, and a smartphone.

14. A non-transitory computer program product having instructions encoded thereon that when executed by one or more computer processors cause the one or more computer processors to perform a process comprising:
  intercepting a message transmitted from a sensor device to a display module, the message including sensor data that is representative of an observed condition at the sensor device;
  providing the sensor data to a user interface configured for editing the sensor data;
  receiving, via the user interface, simulated sensor data that is representative of a simulated condition;
  generating a transformed message based on the simulated sensor data and the intercepted message, the transformed message associated with the sensor device; and
  transmitting the transformed message to the display module, the display module configured to render digital signage based on the transformed message, such that the digital signage reflects the simulated condition.

15. The non-transitory computer program product of claim 14, the process further comprising formatting the intercepted message into a standardized format.

16. The non-transitory computer program product of claim 14, the process further comprising verifying that the simulated sensor data received via the user interface is within a range of values associated with an operational range of the display module.

17. The non-transitory computer program product of claim 14, the process further comprising extracting a sensor identifier and a sensor value from the intercepted message.

18. The non-transitory computer program product of claim 14, the process further comprising downloading rules to a rule-based engine of the display module to further control rendering of the digital signage by the display module based on application of the rules to the transformed message.

19. The non-transitory computer program product of claim 14, wherein the sensor data includes at least one of temperature data, weather data, motion data, geo data, and proximity data.

20. The non-transitory computer program product of claim 14, wherein the user interface is hosted on a mobile platform, and the mobile platform is one or more of a laptop, a tablet, and a smartphone.

* * * * *